United States Patent
Ikuno et al.

(10) Patent No.: US 8,268,917 B2
(45) Date of Patent: Sep. 18, 2012

(54) RESIN COMPOSITION, MOLDED PRODUCT AND METHOD FOR PRODUCING MOLDED PRODUCT

(75) Inventors: Masaya Ikuno, Kanagawa (JP); Kenji Yao, Kanagawa (JP); Sayaka Inoue, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 12/869,033

(22) Filed: Aug. 26, 2010

(65) Prior Publication Data

US 2011/0230607 A1     Sep. 22, 2011

(30) Foreign Application Priority Data

Mar. 16, 2010  (JP) ................................ 2010-058932

(51) Int. Cl.
*C08K 5/5399* (2006.01)

(52) U.S. Cl. ....................................... 524/116; 524/122

(58) Field of Classification Search .................. 524/116, 524/122

See application file for complete search history.

(56) References Cited

U.S. PATENT DOCUMENTS

2011/0118395 A1   5/2011   Kiuchi et al.

FOREIGN PATENT DOCUMENTS

| | | | |
|---|---|---|---|
| EP | 2 264 103 A1 | * | 12/2010 |
| EP | 2 298 836 A1 | | 3/2011 |
| JP | B2 4130695 | | 8/2008 |
| JP | B2 4130696 | | 8/2008 |
| JP | B2 4267945 | | 5/2009 |
| JP | A-2009-270088 | | 11/2009 |
| WO | WO 2009/125872 A1 | | 10/2009 |
| WO | WO 2010/004799 A1 | | 1/2010 |
| WO | WO 2010/053167 A1 | | 5/2010 |

OTHER PUBLICATIONS

Extended European Search Report issued in European Patent Application No. 10176755.6 dated Jul. 11, 2011.

* cited by examiner

*Primary Examiner* — Robert D. Harlan
(74) *Attorney, Agent, or Firm* — Oliff & Berridge, PLC

(57) ABSTRACT

A resin composition, containing at least (A) a polylactic acid, (B) a phosphazene compound and (C) a crystal nucleator.

15 Claims, 1 Drawing Sheet

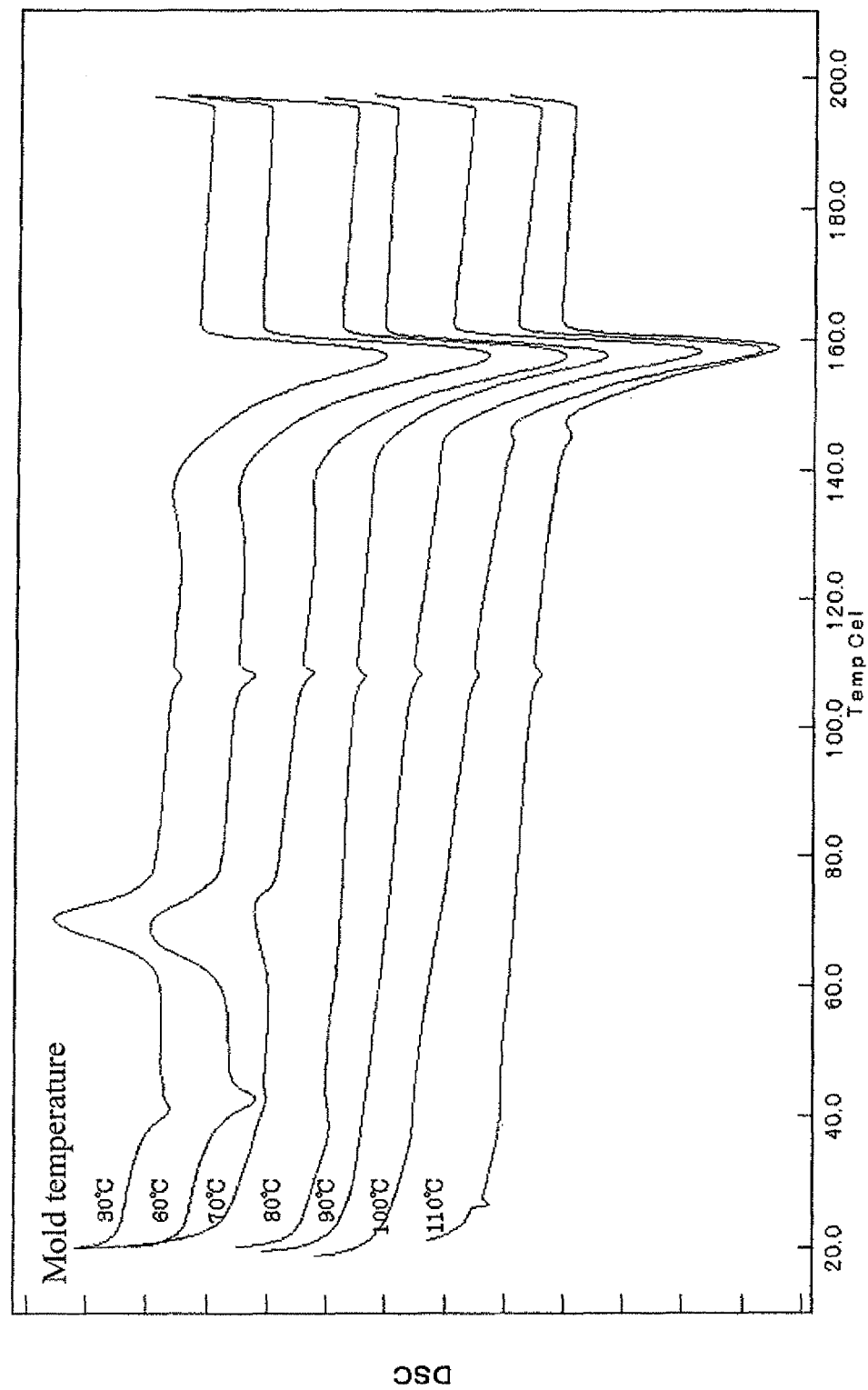

RESIN COMPOSITION, MOLDED PRODUCT AND METHOD FOR PRODUCING MOLDED PRODUCT

CROSS-REFERENCE TO RELATED APPLICATION(S)

The present application claims priority from Japanese Patent Application No. 2010-058932 filed on Mar. 16, 2010, the entire content of which is incorporated herein by reference.

BACKGROUND

1. Field

The present invention relates to a resin composition, a molded product and a method for producing the molded product.

2. Description of the Related Art

Heretofore, a polymer material such as a polystyrene, a polystyrene-ABS resin copolymer, a polycarbonate, a polyester, a polyphenylene sulfide, and a polyacetal have been used for components of electric products and electronic and electric equipments since they are excellent in heat resistance and mechanical strength and, particularly, in the retainability of the mechanical strength against circumstantial changes in a case of the components of the electronic and electric equipments.

SUMMARY

According to an aspect of the invention, there is provided a resin composition containing at least: (A) a polylactic acid; (B) a phosphazene compound; and (C) a crystal nucleator.

BRIEF DESCRIPTION OF DRAWINGS

FIG. 1 is a graph showing a relationship of the mold temperature at the time of molding of the resin composition of Example 1 in this exemplary embodiment with the differential scanning calorimetry (DSC) of the obtained resin molded product.

DETAILED DESCRIPTION OF EXEMPLARY EMBODIMENTS

The following describes exemplary embodiments of the resin composition and the molded product according to the invention. In this connection, the exemplary embodiments are an example for carrying out the invention so that the invention is not limited to the exemplary embodiments.

[Resin Composition]

The resin composition according to the exemplary embodiments contains at least (A) a polylactic acid, (B) a phosphazene compound and (C) a crystal nucleator.

In general, in the case of a polylactic acid resin composition containing a lactic acid type resin, a specified plasticizer and a specified crystal nucleator, a resin molded product can be formed at a temperature lower than the conventional molding temperature, but there is a tendency of worsening the wet heat resistance caused by the influence of hydrolysis. In addition, when a phosphorus system or inorganic hydroxide type flame retardant is added to the polylactic acid, there is a tendency of worsening the wet heat resistance and impact resistance.

The resin composition of the exemplary embodiments is an achievement as a result of examining improvement of wet heat resistance of a resin composition containing a polylactic acid, and a resin molded product having a wet heat resistance superior to the conventional molded product can be formed from a resin material containing a polylactic acid as the main raw material. In addition, when a phosphazene compound and a crystal nucleator are used in combination, crystallization of a polylactic acid is accelerated in comparison with the case of adding the crystal nucleator alone. Though the reason is not clear why it was able to increase the wet heat resistance to an unexpected level in the exemplary embodiments, it is considered that the polylactic acid molecules became a state of more easily arranging for the nucleus in the composition because the phosphazene compound has a relatively high hydrophobic property and therefore increases adhesiveness with the crystal nucleator and the polylactic acid.

The polylactic acids are derived from plants and have an effect of decreasing environmental loads, specifically, decreasing $CO_2$ emissions and decreasing the amount of petroleum to be used. The polylactic acids have no particular restriction so long as they are condensates of lactic acids and may be poly-L-lactic acids (hereinafter also referred to as "PLLA"), poly-D-lactic acids (hereinafter also referred to as "PDLA"), or mixtures of PLLA and PDLA by copolymerization or blending. Further, the polylactic acids may be stereo complex type polylactic acids having highly heat resistance, in which helical structures thereof are combined effectively (hereinafter also referred to as "SC-PLA"). Further, as to the polylactic acids, synthesized products or commercial products may be used. The commercial products include, for example, "TERRAMAC TE4000", "TERRAMAC TE2000", and "TERRAMAC TE7000") manufactured by Unitika Ltd. and "LACEA H100" manufactured by Mitsui Chemicals Inc. The polylactic acids may be used each alone or two or more in combination. In this embodiment, the polylactic acid is contained as a main component of the resin composition. "Main component" means herein that it exceeds 50 mass % based on the entire amount of the resin composition.

The molecular weight of the polylactic acid is not particularly restricted and, in this embodiment, the weight-average molecular weight of the polylactic acid is 8,000 or more and 200,000 or less and, preferably, 15,000 or more and 120,000 or less. In a case where the weight-average molecular weight of the polylactic acid is less than 8,000, the combustion speed of the resin composition increases and the mechanical strength at low temperature tends to be lowered. On the other hand, in a case where the weight-average molecular weight of the polylactic acid exceeds 200,000, soft and flexibility are lowered and the self-extinction by dripping of the resin composition is deteriorated. The flame retardancy tends to be lowered in each of the cases. "Self-extinction by dripping" means that the resin composition is dripped by the heat and disappears.

The weight-average molecular weight of the polylactic acid in the resin composition means a weight-average molecular weight obtained by cooling the resin composition in a liquid nitrogen atmosphere, scraping off a specimen for measurement from the surface thereof, dissolving the specimen for measurement at a concentration of 0.1 mass % in deuterated chloroform and measuring the separated polylactic acid by gel permeation chromatography. Further, for measurement, "HLC-8220GPC" manufactured by Tosoh Corporation is used as a gel permeation chromatograph.

<Phosphazene Compound>

The phosphazene compound used in this embodiment is an organic compound having "—P═N— bond" in the molecule, and a cyclic phenoxy phosphazene, a linear phenoxy phosphazene, and a phenoxy phosphazene are used preferably. Among them, the cyclic phenoxy phosphazene is preferred with a view point of wet heat resistance. The cyclic phenoxy phosphazene includes as commercially available products, for example, "FP-100", "FP-110", and "FP-200" (trade name of products manufactured by Fushimi Pharmaceutical Co., Ltd.), and "SP-100" and "SP-100H" (trade name of products manufactured by Otsuka Chemical Co., Ltd.).

The content of the phosphazene compound in the resin composition of this embodiment is 3 parts or more and 100 parts or less and, preferably, 5 parts or more and 50 parts or less based on 100 parts of the polylactic acid. In a case where the content of the phosphazene compound is less than 3 parts based on 100 parts of the polylactic acid, lowering of the mold temperature and wet heat resistance in carrying out molding become poor. In a case where the content of the phosphazene compounds exceeds 100 parts based on 100 parts of the polylactic acid, the moldability is worsened by bleed out.

In addition, the amount of moisture absorption by the phosphazene compound is 1% or less, preferably 0.5% or less. When the amount of moisture absorption by the phosphazene compound exceeds 1%, the wet heat resistance is worsened.

<Crystal Nucleator>

As the crystal nucleator to be used in the exemplary embodiments, those which are generally used as the crystal nucleator of resins can be used without particular limitation, and any one of inorganic type crystal nucleator and organic type crystal nucleator can be used. As illustrative examples of the inorganic type crystal nucleator, there may be mentioned talc, kaolinite, montmorillonite, synthetic mica, clay, zeolite, silica, graphite, carbon black, zinc oxide, magnesium oxide, titanium oxide, calcium sulfate, boron nitride, calcium carbonate, barium sulfate, aluminum oxide, neodymium oxide and metal salts of phenyl phosphonate, and the like. In order to improve their dispersibility in the composition, it is desirable that these inorganic type crystal nucleator are modified with an organic substance.

Also, as illustrative examples of the organic system crystal nucleator, there may be mentioned sodium benzoate, potassium benzoate, lithium benzoate, calcium benzoate, magnesium benzoate, barium benzoate, lithium terephthalate, sodium terephthalate, potassium terephthalate, calcium oxalate, sodium laurate, potassium laurate, sodium myristate, potassium myristate, calcium myristate, sodium octacosanoate, calcium octacosanoate, sodium stearate, potassium stearate, lithium stearate, calcium stearate, magnesium stearate, barium stearate, sodium montanate, calcium montanate, sodium toluylate, sodium salicylate, potassium salicylate, zinc salicylate, aluminum dibenzoate, potassium dibenzoate, lithium dibenzoate, sodium β-naphthalate, sodium cyclohexanecarboxylate and the like organic carboxylic acid metal salts, sodium p-toluenesulfonate, sodium sulfoisophthalate and the like organic sulfonic acid salts, stearic acid amide, ethylene bislauric acid amide, palmitic acid amide, hydroxystearic acid amide, erucic acid amide, tris(t-butylamide) trimesate and the like carboxylic acid amides, benzylidene sorbitol and derivatives thereof, sodium 2,2'-methylenebis(4,6-di-t-butylphenyl)phosphate and the like phosphorus compound metal salts, and 2,2-methylbis(4,6-di-t-butylphenyl) sodium and the like.

As the crystal nucleator to be used in the exemplary embodiments, among those exemplified in the above, at least one selected from a talc, an organic carboxylic acid metal salt and a carboxylic acid amide is particularly desirable. The crystal nucleator to be used in the exemplary embodiments may be one species alone, or use in combination of two or more species may be carried out.

The content of the crystal nucleator in the resin composition of the exemplary embodiments is from 0.1 part or more and 3 parts or less, preferably from 0.2 part or more and 2 parts or less, based on 100 parts of a polylactic acid. When the content of the crystal nucleator based on 100 parts of the polylactic acid is less than 0.1 part, the rate of crystallization in the mold forming at low temperature is insufficient, and when the content of the crystal nucleator based on 100 parts of polylactic acid exceeds 3 parts, the crystallization is inhibited and the rate of crystallization cannot therefore be obtained sufficiently, due to too much amount of the crystal nucleator in the resin composition.

<Polyfunctional Compound>

The polyfunctional compounds used in this embodiment are compounds having two or more functional groups reacting with a terminal group of the polylactic acid (for example, carboxyl group, hydroxide group, etc.).

The polyfunctional compounds having functional groups reacting with the terminal group of the polylactic acid include, for example, a carbodiimide compound, a dicarboxylic acid compound, a diol compound, a hydroxyl carboxylic acid compound, an epoxy compound, etc.

The carbodiimide compound includes, for example, an aliphatic monodicarbodiimide, an aliphatic diacarbodiimide, an aromatic monocarbodiimide, an aromatic dicarbodiimide, etc.

The dicarboxylic acid compound includes, for example, a succinic acid, an adipic acid, and a sebacic acid.

The diol compound includes, for example, an ethylene glycol, a propylene glycol, and a bisphenol A.

The hydroxyl carboxylic acid compound includes, for example, a lactic acid, a 3-hydroxy butyric acid, a 6-hydroxy hexanoic acid, etc.

The epoxy compound includes, for example, a bisphenol type epoxy, and a novolac type epoxy.

Among them, the polyfunctional compound is preferably a bifunctional compound (a polyfunctional compound having two functional groups) and, particularly preferably, a bifunctional carbodiimide compound.

The carbodiimide compound described above is a compound having two or more functional groups reacting with the terminal groups of a polylactic acid (for example, a carboxyl group, a hydroxyl group, etc.), which is a compound having a carbodiimide group represented by "—N=C—N—" in the molecule. The carbodiimide compound includes, for example, an aliphatic monocarbodiimide, an aliphatic dicarbodiimide, an aromatic monocarbodiimide, an aromatic dicarbodiimide, etc. Among them, bifunctional a compound (a polyfunctional compound having two functional groups), particularly, a bifunctional carbodiimide compound are preferred. The carbodiimide compound may be used each alone or two or more of them may be used in combination. They include, for example, "CARBODILITE" manufactured by Nisshinbo Chemical Inc. (trade name of products).

The content of the polyfunctional compound in the resin composition of this embodiment (total content in a case of using two or more of the compounds in combination) is 0.1 parts or more and 10 parts or less and, preferably, 1 part or more and 5 parts or less based on 100 parts of the polylactic acid. In a case where the content of the polyfunctional compound is less than 0.1 parts based on 100 parts of the polylactic acid, the wet heat resistance is poor. On the other hand, in a case where the content of the polyfunctional compound exceeds 10 parts based on 100 parts of the polylactic acid, the moldability is poor.

<Other Components>

The resin composition in this embodiment may also contain an antioxidant, a stabilizer, an UV-absorbent, and a filler.

The antioxidant includes, for example, phenol type, amine type, phosphoric type, sulfur type, hydroquinone type, and quinoline type antioxidants.

The stabilizer includes, for example, a nitrogen-containing compound such as a basic nitrogen-containing compound, for example, a polyamide, a poly-3-alanine copolymer, a polyacrylamide, a polyurethane, a melamine, a cyanoguanidine, and melamine-formaldehyde condensation products; an alkali or alkaline earth metal-containing compound such as an organic carboxylic acid metal salt (a calcium stearate, a calcium 12-hydroxystearate, etc.), a metal oxide (a magnesium oxide, a calcium oxide, an aluminum oxide, etc.), a metal hydroxide (a magnesium hydroxide, a calcium hydroxide, an aluminum hydroxide, etc.), and a metal carbonate; a zeolite; a hydrotalcite, etc.

The UV-ray absorbent includes a benzophenone type, a benzotriazole type, a cyanoacrylate type, a salicylate type and an oxalic acid anilide type, etc.

The resin composition according to this embodiment may also contain other flame retardants unless deteriorating the impact resistance. Other flame retardants include a silicone type flame retardant, a nitrogen type flame retardant, and an inorganic hydroxide type flame retardant. Further, the flame retardant may be used each alone or two of them in combination.

Further, as the flame retardant, a synthesized product or a commercial product may be used. A phosphoric type commercial flame retardant product includes "PX-200" and "X-202" manufactured by Daihachi Chemical Industry Co. Ltd., "TERRAJU C80" manufactured by BUDENHEIM and "EXOLIT AP422" and "EXOLIT OP930" manufactured by Clariant. A commercial silicone type flame retardant product includes, for example, "DC4-7081" manufactured by Dow Corning Toray Co. Ltd. A commercial nitrogen type flame retardant product includes, "APINONE 901" manufactured by SANWA CHEMICAL Co., Ltd., "Melamine pyrophosphate" manufactured by Shimonoseki Mitsui Chemicals Inc., and "FP2100" manufactured by ADEKA Corporation. An inorganic hydroxide type commercial flame retardant product includes, for example, "MGZ300" manufactured by SAKAI CHEMICAL INDUSTRY Co. Ltd., and "B103ST" manufactured by Nippon Light Metal COMPANY. Ltd.

Further, the filler includes, for example, a clay such as a kaolin, a bentonite, kibushi clay, and gaerome clay, a talc, a mica, a montmorillonite, etc. Further, other fillers include a melamine-containing particle, a phosphate particle, a titanium oxide, etc. Further, the other fillers may be used each alone or two or more of them in combination. Further, a polylactic acid previously added to clay, for example, "TERRAMAC TE7000" manufactured by UNITIKA Ltd. may also be used.

The resin composition in this embodiment may also contain resins other than the polylactic acid, a release agent, a weather proofing agent, a light fastness agent, a colorant, etc.

<Preparation Method of Resin Composition>

The resin composition in this embodiment is manufactured by kneading (A) a polylactic acid, (B) a phosphazene compound, (C) a crystal nucleator, if necessary, (D) a polyfunctional compound, and other components.

Kneading is performed by using known kneading apparatus such as a twin shafts kneader (TEM58SS, manufactured by Toshiba Machine Co., Ltd.), and a simple kneader (LABO-PLASTOMILL, manufactured by Toyo Seiki Seisaku-sho Ltd.

[Molded Product]

The molded product in this embodiment can be obtained by molding the resin composition in this embodiment described above. For example, the molded product according to this embodiment is obtained by molding by a molding method such as injection molding, extrusion molding, blow molding, and hot press molding. In this embodiment, those obtained by injection molding the resin composition of this embodiment are preferred due to the reason of dispersibility of the ingredients in the molded products.

Injection molding is performed by using commercial apparatus such as "NEX150" manufactured by Nissei Plastic Industrial Co., Ltd., "NEX70000" manufactured by Nissei Plastic Industrial Co., Ltd. and "SE50D" manufactured by Toshiba Machine Co., Ltd., etc. In this case, the cylinder temperature is 160° C. or higher and 230° C. or lower and, more preferably, 180° C. or higher and 210° C. or lower with a view point of suppressing the decomposition of the polylactic acid. Further, the die temperature is preferably 30° C. or higher and 110° C. or lower and, more preferably, 30° C. or higher and 100° C. or lower with a view point of productivity.

<Components for Electronic and Electric Equipments>

The molded product in this embodiment described above can be used suitably to the application use, for example, of electronic and electric equipments, home use products, containers, and automobile interior materials since they can be excellent in the moldability and wet heat resistance. More specifically, they are used for casings, various kinds of components, wrapping films, etc. for home use electric products and electronic and electric equipments, containment cases for CD-ROM or DVD, tablewares, trays for foods, beverage bottles, and drug wrapping materials. Among them, they are suitable to components for electronic and electric equipments. Since most of components for electronic and electric equipments have complicate shapes and they are heavy weight products, high impact strength and surface impact strength are required and the resin molded product of this embodiment can sufficiently satisfy such required properties.

EXAMPLE

The following specifically describes the invention with reference to inventive examples and comparative examples, but the invention is not limited to the following examples.

From Inventive Example 1 to Inventive Example 16

Each of the compositions of from Example 1 to Example 16 shown in Table 1 is kneaded using a twin screw kneading apparatus (TEM58SS, manufactured by TOSHIBA MACHINE CO., LTD.) at a cylinder temperature of 190° C. to obtain a resin composition pellet. The thus obtained pellet is formed into an ISO multiple purpose dumbbell specimen (corresponds to ISO 527 tensile test and ISO 178 bending test) (test part thickness 4 mm, width 10 mm) using an injection molding machine (NEX 150, manufactured by Nissei Plastic Industrial Co., Ltd.) at a cylinder temperature of 200° C. and a mold temperature of 100° C.

In addition, regarding the abbreviations of respective components shown in Table 1, their trade names and manufacturers' names are shown in Table 2. In this connection, the B4 of Table 2 is synthesized by the following method.

Synthesis Example

Synthesis of a Chain Phenoxyphosphazene Compound (B4))

441 g (3.55 mol) of p-methoxyphenol was weighted in a 3 L flask equipped with a reflux cooler, a thermometer, and a stirrer, and THF (1.5 L) was added and stirred till they became uniform. And then, 74 g (3.2 g atoms) of metallic sodium was poured therein at a temperature of 50° C. or lower, the temperature rised up to 60° C. for one hour after the completion of pouring, and then they were stirred at 60° C. to 68° C. for 4 hours to obtain a THF solution of sodium p-methoxyphenolate.

Further, 401 g (4.26 mol) of phenol was weighted in a 3 L flask similar to that described above and THF (1.5 L) was added and dissolved. And then, 89 g (3.9 g atoms) of metallic sodium was poured therein at a temperature of 50° C. or lower, the temperature rised up to 60° C. for one hour after the completion of pouring, and then they ware stirred at 60° C. to 68° C. for 4 hours to obtain a THF solution of sodium phenolate.

Separately, a solution containing 75 g (0.65 mol) of dichlorophosphazene polymer described in Synthesis Example 1 dissolved in THF (750 mL), and 475 g (2.58 mol) of chlorobenzene solution containing dichlorophosphazene oligomer having many linear components (63% concentration, trimer: 36%, tetramer: 3%, pentamer and hexamer: 24%, heptamer: 7%, and octamer or higher monomer: 30%) were weighted in a 10 L flask and, further, the THF solution of sodium p-methoxyphenolate was dropped slowly while keeping at a temperature of 30° C. or lower. After dropping, they were stirred for one hour at 30° C. or lower and further stirred for 3 hours under reflux of the solvent (70° C.) after rising the temperature. The reaction solution was once cooled, the THF solution of the sodium phenolate was dropped slowly while keeping the temperature at 30° C. or lower, and they were stirred for one hour after the dropping at 30° C. or lower, and further stirred for 10 hours under reflux of the solvent (70° C.) after rising the temperature.

After completion of the reaction, they were filtered and concentrated, dissolved again in 5 L of chlorobenzene, washed three times with an aqueous 5% solution of sodium hydroxide and once with 5% hydrogen chloride, neutralized by using an aqueous 7% solution of sodium bicarbonate and then washed twice with water. Subsequently, chlorobenzene was distilled off under a reduced pressure, so that 782 g of an oily blown product was obtained.

From the result of 1H-NMR and 31P-NMR measurement, elemental analysis for C, H, N, and measurement for the phosphorous content, it was confirmed that the oily brown product was a phosphazene compound having methoxy groups represented by the formula: $[N=P(OPh)_{0.98}(OC_6H_4\text{-}p\text{-}OCH_3)_{1.02}]n$ (a mixture of trimer: 29%, tetramer: 2%, pentamer and hexamer: 19%, heptamer: 6%, octamer and higher monomers: 44%; 46% of the octamer and the higher monomers was a linear dichlorophosphazene polymer having a weight-average molecular weight of about 10,000). Yield is 92.5%.

<Measurement and Evaluation>

Using the obtained test specimens, each of the following measurement and evaluation was carried out. Table 1 shows the result. (Evaluation of maintaining ratio of Charpy impact strength)

ISO multi-purpose dumbbell test specimens subjected to notch fabrication were used and the Charpy impact strength was measured in the MD direction by a digital impact tester (DG-5, manufactured by Toyo Seiki Seisaku-sho Ltd.) under the conditions at an elevation angle of 150 degree, using a hammer of 2.0 J and at the number of measurement: n=10. In the Charpy impact strength, larger values show more excellent impact resistance.

Next, notch fabricated ISO multi-purpose dumbbell test specimens were subjected to a wet heat test in a condition that is 65° C. under a humidity condition of 95% for 500 hours, and Charpy impact strength is also measured on the specimens after wet heat test.

By regarding ((Charpy impact strength after wet heat test)/(Charpy impact strength before wet heat test))×100 as the maintenance ratio of Charpy impact strength, this is evaluated as an index of wet heat resistance. (Shown by Charpy maintaining ratio %) in the table.)

(Evaluation of Moldability)

Evaluation is made on the releasing of mold and resin compact in the case of a mold temperature of 80° C., 90° C. or 100° C. under the molded product forming condition of ISO multiple purpose dumbbell specimen (manufactured by Nissei Plastic Industrial Co., Ltd., NEX 150, molding temperature 200° C., retention time 50 seconds). Δ or more is regarded as passing.

◯: Very easy to release (no deformation of specimen, ejection from mold is easy)

Δ: Slightly difficult to release (slight deformation of specimen, ejection from mold is difficult)

X: No release (deformation of specimen is large)

From Comparative Example 1 to Comparative Example 3

In the same manner as in Examples, resin composition pellets are obtained from the compositions of from Comparative Example 1 to Comparative Example 3 shown in Table 1, and molding of specimens and respective evaluations are carried out. The results are shown in Table 1.

TABLE 1

| | Polylactic acid | | Phosphazene compound | | Phosphate type flame retarder | | Crystal nucleator | | Polyfunctional compound | | Antioxidant |
|---|---|---|---|---|---|---|---|---|---|---|---|
| | Type | Part | Type | Part | Type | Part | Type | Part | Type | Part | Part |
| Ex. 1 | A1 | 100 | B1 | 40 | — | — | 1% by mass of Nanoclay is added to A1 | | D1 | 2 | 0.3 |
| Ex. 2 | A2 | 100 | B2 | 30 | — | — | C1 | 1.5 | D1 | 2 | 0.3 |
| Ex. 3 | A1 | 100 | B3 | 20 | — | — | 1% by mass of Nanoclay is added to A1 | | D1 | 2 | 0.3 |
| Ex. 4 | A2 | 100 | B1 | 10 | — | — | C1 | 1 | D1 | 2 | 0.3 |
| Ex. 5 | A3 | 100 | B1 | 50 | — | — | C2 | 0.5 | D1 | — | 0.5 |
| Ex. 6 | A3 | 100 | B1 | 50 | — | — | C2 | 0.5 | D1 | 2 | 0.5 |
| Ex. 7 | A2 | 100 | B2 | 30 | — | — | C1 | 0.05 | D1 | 2 | 0.3 |
| Ex. 8 | A2 | 100 | B1 | 30 | — | — | C1 | 3 | D1 | — | 0.3 |

TABLE 1-continued

| | | | | | | | | | | | |
|---|---|---|---|---|---|---|---|---|---|---|---|
| Ex. 9 | A2 | 100 | B1 | 30 | — | — | C1 | 1.5 | D1 | — | 0.3 |
| Ex. 10 | A2 | 100 | B1 | 30 | — | — | C2 | 5 | D1 | 2 | 0.3 |
| Ex. 11 | A2 | 100 | B1 | 30 | — | — | C2 | 1.5 | D1 | 2 | 0.3 |
| Ex. 12 | A2 | 100 | B4 | 30 | — | — | C1 | 1.5 | D1 | 2 | 0.3 |
| Ex. 13 | A2 | 100 | B1 | 4 | — | — | C1 | 1.5 | D1 | 2 | 0.3 |
| Ex. 14 | A2 | 100 | B1 | 55 | — | — | C1 | 1.5 | D1 | 2 | 0.3 |
| Ex. 15 | A2 | 100 | B1 | 30 | — | — | C1 | 1.5 | D1 | 2 | 0.3 |
| Ex. 16 | A2 | 100 | B1 | 30 | — | — | C1 | 1.5 | D1 | 0.05 | 0.3 |
| Comp. Ex. 1 | A4 | 100 | — | — | — | — | C3 | 0.5 | D1 | 1 | — |
| | | | | | | | C4 | 0.5 | | | |
| Comp. Ex. 2 | A2 | 100 | — | — | B5 | 40 | C1 | 1.5 | D1 | 2 | 0.5 |
| Comp. Ex. 3 | A2 | 100 | — | — | — | — | C2 | 0.5 | D1 | 2 | 0.5 |

| | Phosphate type stabilizer | Plasticizer | Evaluation Moldability (mold temp.) | | | Charpy impact strength maintaining |
|---|---|---|---|---|---|---|
| | Part | Part | 80° C. | 90° C. | 100° C. | ratio (%) |
| Ex. 1 | 0.6 | — | ○ | ○ | ○ | 95 |
| Ex. 2 | 0.6 | — | ○ | ○ | ○ | 95 |
| Ex. 3 | 0.6 | — | ○ | ○ | ○ | 70 |
| Ex. 4 | 0.6 | — | Δ | ○ | ○ | 55 |
| Ex. 5 | — | — | Δ | Δ | ○ | 80 |
| Ex. 6 | — | — | Δ | Δ | ○ | 95 |
| Ex. 7 | 0.6 | — | Δ | Δ | ○ | 90 |
| Ex. 8 | 0.6 | — | Δ | ○ | ○ | 65 |
| Ex. 9 | 0.6 | — | Δ | Δ | ○ | 75 |
| Ex. 10 | 0.6 | — | Δ | ○ | ○ | 60 |
| Ex. 11 | 0.6 | — | Δ | Δ | Δ | 70 |
| Ex. 12 | 0.6 | — | ○ | ○ | ○ | 85 |
| Ex. 13 | 0.6 | — | Δ | Δ | ○ | 50 |
| Ex. 14 | 0.6 | — | Δ | Δ | Δ | 95 |
| Ex. 15 | 0.6 | — | ○ | ○ | ○ | 95 |
| Ex. 16 | 0.6 | — | ○ | ○ | ○ | 75 |
| Comp. Ex. 1 | — | 10 | ○ | ○ | ○ | 25 |
| Comp. Ex. 2 | — | — | X | X | Δ | 80 |
| Comp. Ex. 3 | — | — | X | X | Δ | 40 |

TABLE 2

| Symbol | Component names | Trade names | Manufacturer names | Remarks |
|---|---|---|---|---|
| A1 | Polylactic acid | TERRAMAC TE7000 | UNITIKA, LTD. | Contains 1 part by mass of clay |
| A2 | Polylactic acid | TERRAMAC TE4000 | UNITIKA, LTD. | Clay not contained |
| A3 | Polylactic acid | LACEA H100 | Mitsui Chemicals Inc. | Clay not contained |
| A4 | Polylactic acid | LACEA H100 | Mitsui chemicals Inc. | Clay not contained |
| B1 | Cyclic phenoxyphosphazene | FP-110 | FUSHIMI Pharmaceutical Co., Ltd. | — |
| B2 | Cyclic phenoxyphosphazene | SP-100 | Otsuka Chemical Co., Ltd. | — |
| B3 | Cyclic phenoxyphosphazene | SP-100H | Otsuka Chemical Co., Ltd. | — |
| B4 | Chain phenoxyphosphazene | Synthetic product | — | — |
| B5 | Phosphate type flame retarder | PX-200 | DAIHACHI CHEMICAL INDUSTRY Co., Ltd. | — |
| C1 | Crystal nucleator | Talc | NIPPON TALC Co., Ltd. | — |
| C2 | Crystal nucleator | Eco Promote | Nissan Chemical Industries, Ltd. | — |
| C3 | Crystal nucleator | Slipacks H | Nippon Kasei Chemical Co., Ltd. | — |
| C4 | Crystal nucleator | PPA-Zn | Nissan Chemical Industries, Ltd. | — |

TABLE 2-continued

| Symbol | Component names | Trade names | Manufacturer names | Remarks |
|---|---|---|---|---|
| D1 | Carbodiimide compound | CARBODILITE | Nisshinbo Chemical Inc. | — |
| — | Antioxidant | IRGANOX 1010 | Ciba Inc. | — |
| — | Phosphate type stabilizer | Sandostab P-EPQ | SANDOZ | — |
| — | Plasticizer | Diester of succinic acid and triethylene glycol monomethyl ether (synthetic product) | | |
| E1 | Flame-retarding coagent (polycarbonate) | lupilon S3000 | Mitsubishi Gas Chemical Co., Inc. | — |
| E2 | Flame-retarding coagent (nitrogen-containing compound) | PMP200 | Nissan Chemical Industries, Ltd. | — |

FIG. 1 shows a result of differential scanning calorimetry (DSC) of respective specimens when a resin composition having the composition shown in Example 1 is formed by setting respective mold temperatures to respective temperatures of from 30° C. to 110° C. An amorphous component-derived crystallization peak (cold crystallization peak) is not observed in the DSC chart of the specimens molded at a mold temperature of 90° C. or more. Thus, it can be seen that crystallization is already advanced at a mold temperature of 90° C. or more. Accordingly, it can be said that a polylactic acid resin composition having advanced crystallization even at a low temperature mold, in comparison with the general polylactic acid resin composition, is obtained from the resin compact of the exemplary embodiment, and that its ejection property from the mold is improved.

Industrial Applicability

Application examples of the present invention include application to resin molded products such as electronic and electric instruments, domestic electric products, containers, and automobile interior materials.

While the present invention has been shown and described with reference to certain exemplary embodiments thereof, it will be understood by those skilled in the art that various changes modifications may be made therein without departing from the spirit and scope of the present invention as defined by the appended claims.

What is claimed is:

1. A resin composition, comprising at least:
   (A) a polylactic acid;
   (B) a phosphazene compound; and
   (C) a crystal nucleator,
   wherein the phosphazene compound (B) is contained in an amount of from 30 parts by mass or more and 55 parts by mass or less, based on 100 parts by mass of the polylactic acid (A).

2. The resin composition as set forth in claim 1, further comprising:
   (D) a polyfunctional compound.

3. The resin composition as set forth in claim 1, wherein the phosphazene compound (B) contains one selected from the group consisting of a cyclic phenoxy phosphazene, a linear phenoxy phosphazene and a phenoxy phosphazene.

4. The resin composition as set forth in claim 1, wherein the crystal nucleartor (C) contains one selected from the group consisting of a talc, an organic carboxylic acid metal salt and a carboxylic acid amide.

5. The resin composition as set forth in claim 1, wherein the crystal nucleartor (C) is contained in an amount of from 0.1 part by mass or more and 3 parts by mass or less, based on 100 parts by mass of the polylactic acid (A).

6. The resin composition as set forth in claim 2, wherein the polyfunctional compound (D) is contained in an amount of from 0.1 part by mass or more and 10 parts by mass or less, based on 100 parts by mass of the polylactic acid (A).

7. The resin composition as set forth in claim 2, wherein the polyfunctional compound (D) contains one selected from the group consisting of a carbodiimide compound, a dicarboxylic acid compound, a diol compound, a hydroxyl carboxylic acid compound and an epoxy compound.

8. A resin molded product, comprising at least:
   (A) a polylactic acid;
   (B) a phosphazene compound; and
   (C) a crystal nucleator,
   wherein the phosphazene compound (B) is contained in an amount of from 30 parts by mass or more and 55 parts by mass or less, based on 100 parts by mass of the polylactic acid (A).

9. The resin molded product as set forth in claim 3, further comprising:
   a polyfunctional compound (D).

10. The resin molded product as set forth in claim 3, wherein the phosphazene compound (B) contains one selected from the group consisting of a cyclic phenoxy phosphazene, a linear phenoxy phosphazene and a phenoxy phosphazene.

11. The resin molded product as set forth in claim 3, wherein the crystal nucleartor (C) contains one selected from the group consisting of a talc, an organic carboxylic acid metal salt and a carboxylic acid amide.

12. The resin molded product as set forth in claim 3, wherein the crystal nucleartor (C) is contained in an amount of from 0.1 part by mass or more and 3 parts by mass or less, based on 100 parts by mass of the polylactic acid (A).

13. The resin molded product as set forth in claim 4, wherein the polyfunctional compound (D) is contained in an amount of from 0.1 part by mass or more and 10 parts by mass or less, based on 100 parts by mass of the polylactic acid (A).

14. The resin molded product as set forth in claim 4, wherein the polyfunctional compound (D) contains one selected from the group consisting of a carbodiimide compound, a dicarboxylic acid compound, a diol compound, a hydroxyl carboxylic acid compound and an epoxy compound.

15. The resin molded product as set forth in claim 3, which is a component of electronic and electric equipments.

* * * * *